United States Patent [19]

Petrovsky et al.

[11] 4,184,156
[45] Jan. 15, 1980

[54] DOPPLER RADAR DEVICE FOR MEASURING SPEED OF MOVING OBJECTS

[76] Inventors: Viktor A. Petrovsky, ulitsa Pugacheva, 19-a, kv. 49; Lev G. Gassanov, ulitsa Uritskogo 25, kv. 65, both of Kiev; Sergei M. Belyaev, ulitsa Magnitogorskaya 3, kv. 97; Lev A. Kochetov, ulitsa Khersonskaya 3, kv. 30, both of Moscow; Vitaly L. Kryzhanovsky, ulitsa Transheinaya 11, kv. 1, Kiev; Andrei A. Palamarchuk, ulitsa Saratovskaya 49, kv. 18, Kiev; Rafail J. Timraleev, ulitsa Levanevskogo 4, kv. 43-2, Kiev; Viktor D. Ushakov, ulitsa D. Bednogo 25, kv. 25, Kiev; Vitaly M. Parfenjuk, ulitsa Geroev Sevastopolya, 33, kv. 55, Kiev, all of U.S.S.R.

[21] Appl. No.: 928,451

[22] Filed: Jul. 27, 1978

[30] Foreign Application Priority Data

Jul. 28, 1977 [SU] U.S.S.R. .................................. 2534931

[51] Int. Cl.² ................................................. G01S 9/44
[52] U.S. Cl. ..................................... 343/8; 343/5 DD
[58] Field of Search ............................ 343/5 DD, 8

[56] References Cited

U.S. PATENT DOCUMENTS

| 3,120,640 | 2/1964 | Midlock et al. | 343/8 X |
| 3,187,329 | 6/1965 | Midlock | 343/8 |
| 3,512,155 | 5/1970 | Bloice | 343/5 DD X |
| 3,691,556 | 9/1972 | Bloice | 343/5 DD X |

Primary Examiner—T. H. Tubbesing
Attorney, Agent, or Firm—Fleit & Jacobson

[57] ABSTRACT

A doppler radar device for measuring the speed of moving objects, which comprises a casing with an antenna, a transmitter-receiver unit and a data-processing unit enclosed therein, control elements and a power cable. The casing is formed with an elongated tubular section of heat-conducting material, the antenna and units being successively arranged along the casing and rigidly interconnected to enable thermal contact therebetween and the casing. The outer periphery of the units is shaped to correspond to the inner surface of the casing.

7 Claims, 10 Drawing Figures

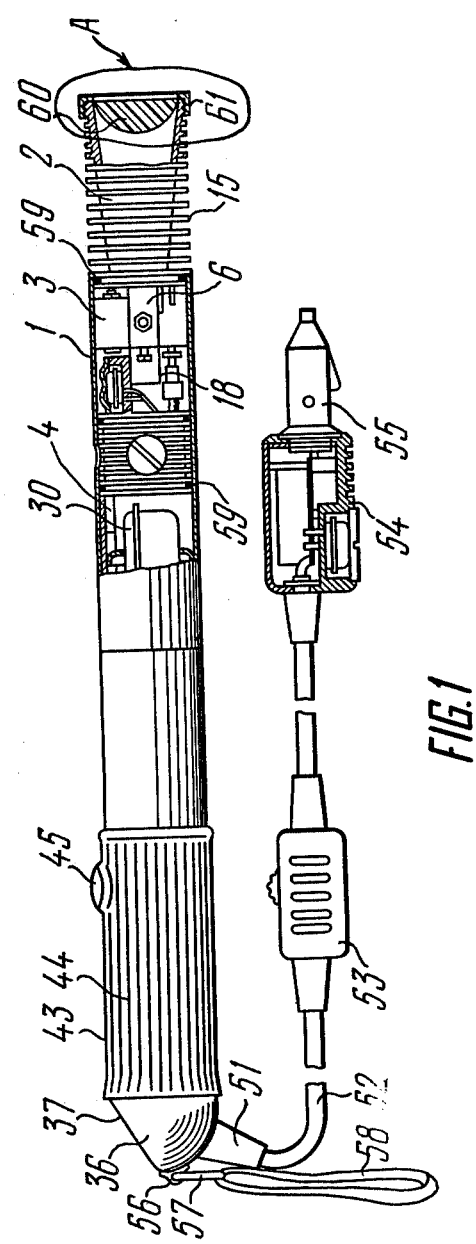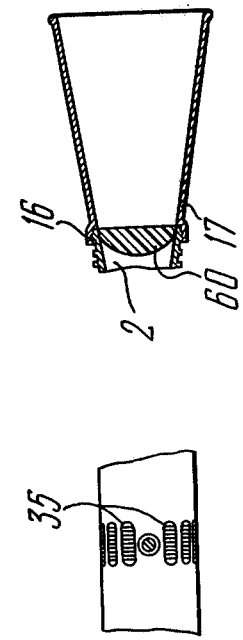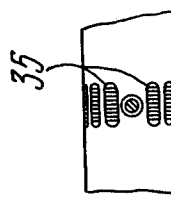

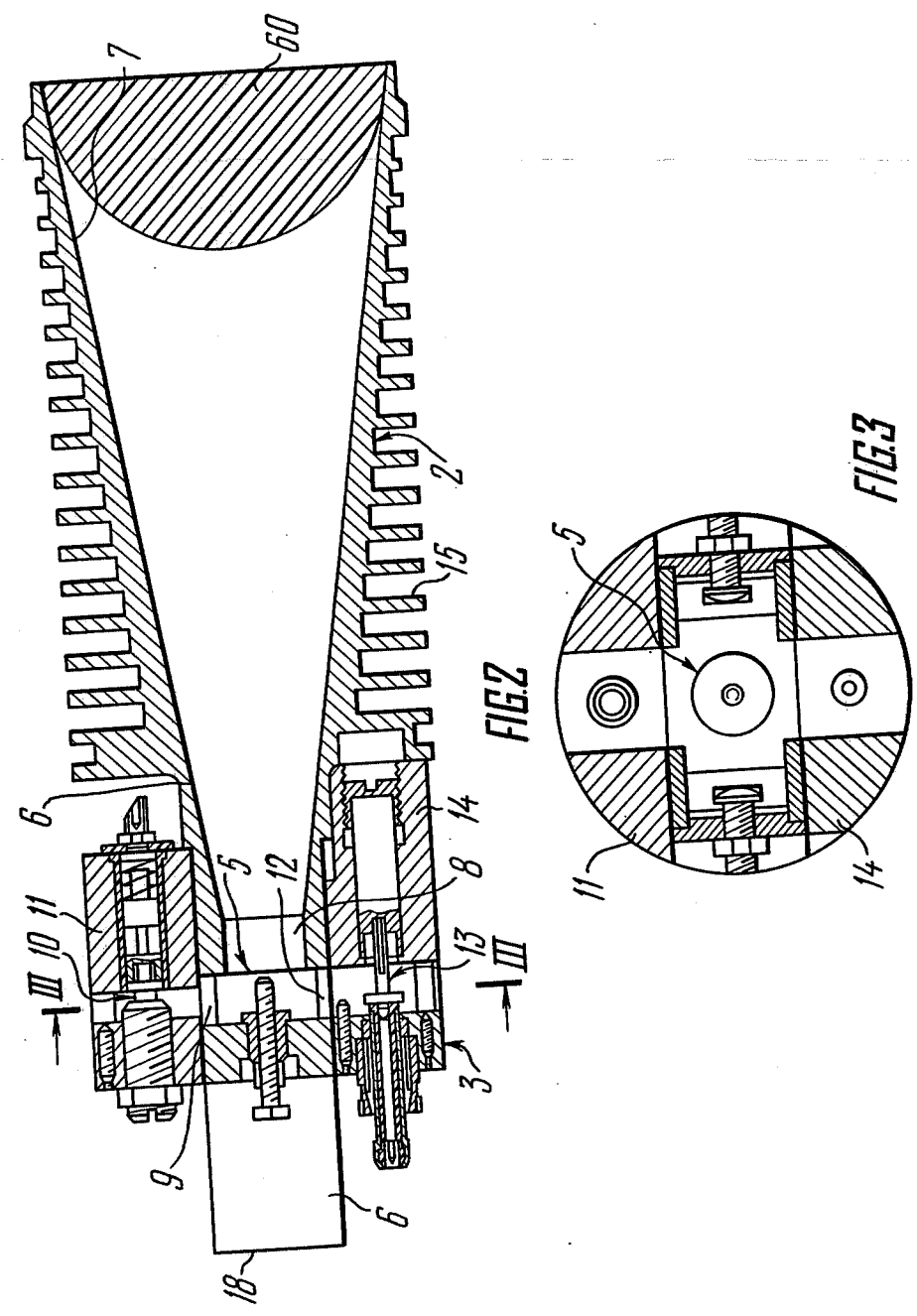

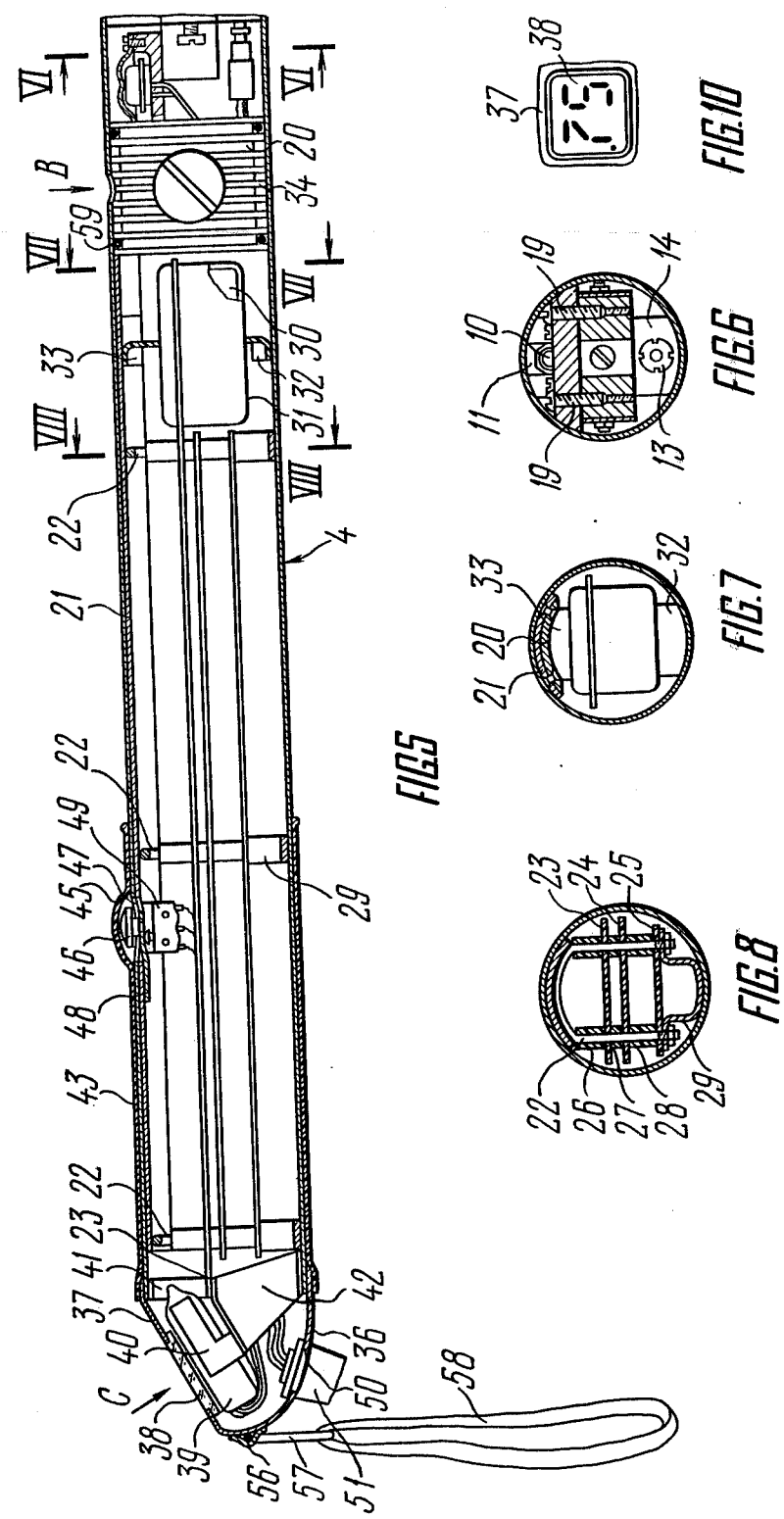

DOPPLER RADAR DEVICE FOR MEASURING SPEED OF MOVING OBJECTS

FIELD OF THE INVENTION

This invention relates to speed-measuring radar devices and, more particularly, to Doppler radar devices for measuring the speed of moving objects, used primarily in traffic surveillance and control systems. This invention may also be used as a portable means for measuring the speed of landing aircraft (speed monitoring by ground personnel), the approach and mooring speeds of ships, the speed of objects during sporting events involving the use of various vehicles, the speed of moving objects in industrial use, the speed of mud-laden torrents, etc.

DESCRIPTION OF THE PRIOR ART

Known in the art are various mobile Doppler radar devices for measuring the speed of moving objects such, for instance, as the apparatus for vehicular speed measurements disclosed in U.S. Pat. No. 3,187,329. In such devices, a transmitter-receiver unit and an antenna are mounted on the outside of a vehicle, whereas means for processing and displaying information (signals bouncing off a target object) are arranged inside the vehicle. Devices of the type are rather bulky, which generally limits the field of their application.

Also known in the art are portable Doppler radar devices for measuring the speed of moving objects such, for instance, as the speedgun manufactured by CMJ Inc. (Minturn, Colo.); the type HR8 traffic surveillance hand radar meter manufactured by the French firm SIDEN-TELEC (SIDETEL) (cf "Radar à main pour surveillance routiére type HR8"); and the mini-radar system manufactured by the Swiss firm Multanova (cf "Nova-Radar das Miniradar-Gerätesystem des Multanova-Herstellers").

In such devices comprising a transmitter, a receiver with its mixer accepting a portion of transmitter output as a reference (heterodyne) voltage, a Doppler-frequency amplifier and an actuator (speed data processing and display unit), all functional units are enclosed in a comparatively small casing. Current is drawn from a vehicular power source through a cable. Such devices may also be used as self-contained units operating from adequate and compact power sources (batteries). For example, the speedgun is a gun contained within a heavy casing and comprising two longitudinally detachable halves of intricate shape (aluminium alloy castings). Lugs inside the casing are used for securing functionally independent units: a transmitter-receiver unit with a heavy horn antenna having a surface large enough to dissipate heat generated while the oscillator is in operation; an amplifier and signal-shaping unit complete with a voltage regulator; and a data-processing and display unit (actuator) employing a comparatively large printed-circuit board. Control elements are provided both on the inside and outside of the casing and also on the power cable (on-off switch).

The functional units contained within the casing are attached independently (parallel arrangement), the interconnection thereof being for the most part electrical. The printed-circuit board mounting the data-processing unit is protected with an electrostatic shield. With this arrangement, gaps are provided between the functional units to enable convectional rejection of heat generated in large amounts while the emission oscillator and voltage regulator are in operation. With such an arrangement, however, there is quite a number of limiting factors such as: failure to meet compactness requirements (modern trend towards portable small-size devices); failure to fully meet sealing requirements essential in using the devices under adverse weather conditions (rain, fog, snow, elevated humidity); failure to withstand vibration on moving objects such, for example, as civil ships; and failure to meet dynamic strength requirements essential, for example, in using the aforesaid device both as a speed meter and a traffic controller's baton.

SUMMARY OF THE INVENTION

It is an object of the present invention to provide a compact small-size Doppler radar device for measuring the speed of moving objects, which is suitable for a wide range of uses, gives enhanced resistance to vibration as a system and possesses higher dynamic strength within mechanical connections between functional units and a casing.

Another object of the invention is to provide a portable speed-measuring radar device suitable for a wide range of uses.

A further object of the invention is to provide a portable speed-measuring device which offers promise as a miniature device employing shorter waves.

There is disclosed a Doppler radar device for measuring the speed of moving objects, comprising a casing with an antenna, a transmitter-receiver unit and a data-processing unit (actuator) arranged therein, control elements and a power cable, the casing being formed, according to the invention, with an elongated tubular section of heat-conducting material and the antenna and units being successively arranged along the casing and rigidly interconnected to enable thermal contact therebetween and the casing, the outer periphery of said units being shaped to correspond to the inner surface of the casing with a view to ensuring a good thermal contact with the casing and increasing dynamic strength of the device.

Preferably, the casing is made round in cross-section to facilitate production thereof and functional units arranged therein.

Advantageously, a stationary, horn antenna is made integral with the transmitter-receiver unit, the latter comprising a turnstile polarizer having an unbalanced arm arranged parallel to the axis of the casing and passing into the stationary horn antenna, having one of its balanced arms connected with a Gunn oscillator, and having the other balanced arm connected with a mixer, said Gunn oscillator and mixer being located within sector-shaped bases, and the radii of the sectors of the bases being equal to one half the inner diameter of the casing.

Preferably, the end face of the stationary horn antenna is employed as a locating surface for removable taper attachments changing the aperture of the antenna.

Advantageously, the base of the data-processing unit is made cylindrical and provided with an arched plate comprising several rods with parallel printed-circuit boards of the data-processing unit secured to said rods, the radius of the cylindrical base and arched plate being equal to one half the inner diameter of the casing.

Preferably, the cylindrical base is provided with heat-rejecting ribs to enable an efficient rejection of heat into the surrounding space and the casing has ventilating holes opposite said ribs.

Preferably, the casing is provided with a hermetic radome housing, on the side of the antenna, and with a cover having a transparent window, on the side of the data-processing unit, and has sealing gaskets at points of communication with the atmosphere.

BRIEF DESCRIPTION OF THE DRAWINGS

The invention will now be described in greater detail with reference to specific embodiments thereof, taken in conjunction with the accompanying drawings in which:

FIG. 1 is a general view of a Doppler radar device for measuring the speed of moving objects in the form of a traffic controller's baton, according to the invention;

FIG. 2 is a longitudinal section view of the transmitter-receiver unit with the antenna;

FIG. 3 is a section taken along the line III—III of FIG. 2;

FIG. 4 shows detail A in FIG. 1 complete with the taper attachment;

FIG. 5 is a longitudinal section view of the data-processing unit with part of the casing;

FIG. 6 is a section taken along the line VI—VI of FIG. 5;

FIG. 7 is a section taken along the line VII—VII of FIG. 5;

FIG. 8 is a section taken along the line VIII—VIII of FIG. 5;

FIG. 9 is a view along arrow B of FIG. 5; and

FIG. 10 is a view along arrow C of FIG. 5.

DESCRIPTION OF THE INVENTION

The device of the invention shown in FIGS. 1 through 10 has the appearance of a traffic controller's baton. Referring to FIGS. 1 and 5 the device of the invention comprises a casing 1 formed with an elongated section of a thin-walled round tube of a suitable material readily conducting heat such, for example, as an aluminium alloy.

Arranged successively in the casing 1 are a stationary horn antenna 2 integral with a transmitter-receiver unit 3, and a data-processing unit 4. The data-processing unit 4 may incorporate the following circuit components: a voltage regulator, a Doppler frequency amplifier, a time interval shaper, a counting pulse train shaper, a counter, a synthesizer, a synchronizer, and a digital display indicating the speed of a moving object. Since this invention is not concerned with circuitry and radio engineering problems, any known solution is acceptable in principle and, consequently, no electrical and radio engineering drawings are attached.

The outer periphery of the antenna 2 and units 3, 4 is shaped to correspond to the inner periphery of the casing 1, which ensures a good thermal contact therebetween and the casing 1 and increases resistance to vibration and dynamic strength of the entire device and of each individual unit (2, 3, 4).

FIGS. 2 and 3 show in greater detail the transmitter-receiver unit 3 with the stationary horn antenna 2. The unit 3 includes a turnstile polarizer 5 arranged within a base 6 wherein an inner taper surface 7 forming the stationary horn antenna 2 is comprised.

An unbalanced arm 8 of the turnstile polarizer 5 is arranged parallel to the axis of the cylindrical casing 1. The arm 8 passes into the stationary horn antenna 2. Connected with a balanced arm 9 of the turnstile polarizer 5 is a Gunn oscillator 10 contained within a sector-shaped base 11 secured to the base 6. Connected with a balanced arm 12 of the turnstile polarizer 5 is a mixer 13 contained within a sector-shaped base 14 rigidly connected to the base 6. The antenna 2 is provided with heat-rejecting ribs 15 arranged on the outside of the base 6. The ribs 15 intensively reject heat generated while the Gunn oscillator 10 operates in the CW mode. The sector-shaped bases 11 and 14 have a radius equal to one half the inner diameter of the casing 1 to enable tight fitting of the transmitter-receiver unit 3 in the casing 1. A good thermal contact is thus provided between the unit 3 and the casing 1 to compensate for a large amount of heat generated while the unit 3 operates for emission. For the same purpose, the bases 6, 11 and 14 are made of an aluminum alloy having a high heat capacity and conduction. The stationary horn antenna 2 has an externally threaded locating surface 16 (FIG. 4) on the base 6 for coupling to the antenna 2 removable taper attachments 17 changing the aperature of the antenna 2 and in effect the operational range and resolution of the device. The transmitter-receiver unit 3 with the antenna 2 is rigidly coupled to the data-processing unit 4 by means of a shank 18 (FIG. 1) and two screws 19 (FIG. 6). The data-processing unit 4 (FIG. 5) is a rigid structure tightly fitted in the casing 1 to enable thermal contact therebetween. Constructionally, the unit 4 is a cylindrical base 20 with cavities therein mounting voltage regulator components and circuit components of the unit 4 (not shown in the drawings). Rigidly connected along the edge of the cylindrical base 20 is an arched plate 21 (FIGS. 5, 7) mounting several rods 22 (FIG. 8) with printed-circuit boards 23, 24, 25 of the unit 4 secured thereto. The boards 23, 24 and 25 are secured to the rods 22 by means of spacers 26, 27, 28 and arched clamps 29 resting against the inner surface of the casing 1. Arranged on the board 23 adjacent the cylindrical base 20 (FIG. 5) is a Doppler-frequency amplifier 30 enclosed in a housing 31. The amplifier 30 is held firmly in the casing 1 with the aid of dielectric supports 32 and 33 in order that resistance to vibration and dynamic strength of the entire device be increased. The dielectric supports 32 and 33 preclude heat transfer from the casing 1 to the amplifier 30. Heat-rejecting ribs 34 on the cylindrical base 20 and ventilating holes 35 (FIG. 9) in the casing 1 opposite the ribs 34 are provided to reject into the surrounding space the heat generated while the voltage regulator of the unit 4 (FIG. 5) is in operation. The cylindrical base 20, arched plate 21 and clamps 29 have a radius equal to one half the inner diameter of the casing 1 to ensure thermal contact between the unit 4 and the casing 1 and to increase resistance to vibration and dynamic strength of the device.

Mounted on the end of the casing 1 (FIGS. 1, 5) opposite the end face of the antenna 2 is a hermetic spherical cover 36 having a flat surface 37 positioned at an angle of 30° with respect to the axis of the casing 1. The surface 37 mounts a transparent window 38. Digital display tubes 39 (FIG. 5) are positioned inside the casing 1 opposite the window 38. The tubes 39 are arranged at an angle of 30° with respect to the axis of the casing 1 on a chassis 40 secured to the board 23 and fixed in the casing 1 by means of supports 41 and 42.

FIG. 10, which is a view along arrow C of FIG. 5, shows a speed reading in the form of two digits and a point (a speed exceeding 100 km/h) at the moment it is stored by the memory circuit of the data-processing unit 4.

Fitted tightly on the end of the casing 1 (FIGS. 1, 5), on the side of the cover 36, is a rubber knob 43 having a knurled surface 44 and a lug 45 under which there is a button 46 controlling operation of the data-processing unit 4. The button 46 extends beyond the outer surface of the casing 1 through a hole 47 in the casing 1 and arched plate 21. The button 46 is secured to a spring plate 48 rigidly coupled to the plate 21. On application of pressure, the button 46 cooperates with a control element 49 secured to the plate 21. The control element 49 is electrically connected to the data-processing unit 4. The cover 37 has a hole 50 provided with a rubber seal 51 to receive a power cable 52 having a switch 53, a voltage regulator 54 for the Gunn oscillator 10, and a plug 55. In the preferred embodiment of the invention the voltage regulator 54 for the Gunn oscillator 10 is arranged outside the casing 1 to reduce the dimensions of the device.

In other embodiments of the invention the voltage regulator 54 may be arranged within the casing 1 on the cylindrical base 20 for which purpose the latter should be increased in length and provided with additional heat-rejecting ribs.

The cover 36 is also provided with an eye 56 mounting a ring 57 and a leather loop 58 designed for carrying the device not in use and for employing it as a traffic controller's baton.

Sealing gaskets 59 are provided to seal the joints between the casing 1 and the antenna 2 and between said casing and the cylindrical base 20 facing the ventilating holes 35 in the casing 1. The stationary horn antenna 2 is provided with a hermetic radome housing 60. The locating surface 16 is provided with a detachable safety ring 61.

The joints between the transparent window 38 and the cover 37 and between said cover and the casing 1 are sealed with a sealing compound (not shown in the drawings). The joint between the cover 37 and the casing 1 is additionally sealed with the rubber knob 43 which is also used to seal the point at which the button 46 comes out of the casing 1. The casing 1 has black and white stripes to look like a traffic controller's baton.

To increase resistance to vibration and dynamic strength of the device, gaps within the unit 4 may be filled with a heat-conducting compound.

The device of the invention operates in the following manner.

The plug 55 (FIGS. 1, 5) connects the device to a power source (a vehicular battery or a belt-carried battery power supply, not shown in the drawings). The switch 53 feeds power to the Gunn oscillator 10 of the transmitter-receiver unit 3. The Gunn oscillator 10 produces microwave oscillations. The output of the Gunn oscillator 10 is supplied to the turnstile polarizer 5 converting a linearly polarized wave into an elliptically polarized wave radiated by the antenna 2. A portion of the output is fed to the mixer 13. A signal bouncing off a moving object and having a Doppler frequency shift is applied to the mixer 13, wherein the Doppler frequency is discriminated, and is fed therefrom to the Doppler frequency amplifier 30. Thereafter the amplified Doppler frequency signal is delivered to the data-processing unit 4 employing the printed-circuit boards 23, 24 and 25. Information on the speed of the target object is fed from the unit 4 to the digital display tubes 39 wherein the speed of the moving object in question is continuously indicated on application of pressure to the button 46 which transfers the unit 4 to the speed-measuring mode through the control element 49. When the button 46 is released, the control element 49 opens the measuring circuit and completes the memory circuit whereby a fixed speed reading will appear on the digital display in the form of one or two digits, if the speed of the target object is not over 100 km/h, or in the form of two digits with a point therebetween (FIG. 10), if the speed of the target object exceeds 100 km/h. The speed measurement range is from 1 km/h to 200 km/h. As stated above, the antenna aperature may be changed by using the removable tapered attachments 17 to increase the operational range of the device without degrading the reception characteristics thereof. To measure the speed of a moving object, the operator tends to aim the casing 1 of the device at the object which may be approaching or receding so as to provide a minimum angle between the axis of movement of the target object and the axis of the casing 1 whereby the measuring accuracy will be increased. When the motorist exceeds the speed limit, the operator releases the button 46 to provide a fixed speed reading and uses the device as a baton to stop the infringer.

The preferred embodiment of the invention has been tested at an ambient temperature of $-30°$ C. to $+50°$ C. and an air humidity of up to 98% and proved to be fail-safe. A sealed version of the device is suitable for use under adverse weather conditions (torrential rain, fog).

The device according to the invention is not limited to applications in traffic surveillance and control systems. The preferred embodiment of the invention may be vibration-proof and possess a sufficient dynamic strength to enable its uses in various other fields. So, for example, one embodiment of the invention may be used to measure the approach speed of civil ships and also the speed of civil ships approaching each other alongside or going to moorings. Such a device may be installed on a small gyro platform in order that it is level during ship motions.

If the device according to the invention is provided with a taper attachment of sufficient length as dictated by construction rigidity, it may be used by ground personnel for measuring the speed of landing aircraft.

Advantages of the device of the invention made in accordance with the invention are as follows.

The proposed device may be used in traffic surveillance and control systems without attracting motorists' attention, since it has the appearance of a traffic controller's baton.

The size of the device and its weight are substantially reduced (a preferred embodiment of the invention is three times as small as the prior art speedgun and weighs 300 g less) and heat rejection into the surrounding space during operation is efficient.

The device according to the invention has an enhanced resistance to vibration and a high dynamic strength, an advantage practically unthinkable with prior art arrangements.

The proposed device offers promise in view of the miniaturization trend, since an adequate and promising solution has been found to the problem of having a larger amount of heat generated during operation of the device comprising a smaller transmitter-receiver unit and an antenna as the swing towards higher oscillator frequencies is becoming more apparent. Such a solution to the heat problem makes it possible to improve the basic characteristic of the device namely, the oscillator carrier. A preferred embodiment of the invention operates at a carrier frequency of 24.1 GH$_3$ ($\lambda$=1.2 cm), which increases its noise immunity under present-day conditions characterized by the presence of various electromagnetic oscillations on the air, particularly within a 3-cm band utilized, for instance, by the prior art speedgun.

Rough estimations show that the proposed device operates reliably at an ambient temperature of up to +50° C. in spite of the fact that a thermal load per unit area in the preferred embodiment is approximately two orders higher than that of the prior art speed-gun (at f=24.1 hHz). The provision of removable taper attachments, dictated by construction rigidity, makes it possible to increase the operational range and resolution of the device without impairing the reception characteristics thereof.

The device according to the invention may be sealed in a simple manner to permit its utilization under adverse weather conditions.

The herein described embodiment of the invention is illustrative of features of the invention and in no wise is to be considered restrictive thereof, inasmuch as various changes in application and details of construction may be resorted to by those skilled in the art without departing from the scope thereof.

What is claimed is:

1. A Doppler radar device for measuring the speed of moving objects comprising
   a casing formed with an elongated tubular section of heat-conducting material;
   an antenna arranged in said casing to enable thermal contact therebetween;
   a transmitter-receiver unit arranged in said casing behind said antenna along said casing and rigidly coupled with said antenna to enable thermal contact therebetween and said casing;
   a data-processing unit arranged in said casing behind said transmitter-receiver unit along said casing to enable thermal contact with said adjacent unit and said casing;
   said antenna, transmitter-receiver unit and data-processing unit having the outer periphery shaped to correspond to the inner surface of said casing;
   control elements for controlling operation of said device;
   and a power cable.

2. A speed-measuring radar device as claimed in claim 1, wherein said casing is a tubular section of round profile.

3. A speed-measuring radar device as claimed in claim 2 comprising
   the antenna made integral with the transmitter-receiver unit;
   said transmitter-receiver unit comprising a turnstile polarizer;
   said turnstile polarizer having one unbalanced arm and two balanced arms;
   the unbalanced arm of said polarizer arranged parallel to the axis of said casing and passing into said stationary horn antenna;
   a first one of said balanced arms of said polarizer connected to a Gunn oscillator which is located within a first sector-shaped base;
   a second balanced arm connected to a mixer which is located in a second sector-shaped base;
   the sectors of said bases having a radius equal to one half the inner diameter of said casing.

4. A speed-measuring device as claimed in claim 3, wherein the end face of said horn antenna is employed as a locating surface for removable taper attachments changing the aperature of said antenna.

5. A speed-measuring radar device as claimed in claim 2, wherein said data-processing unit contains a cylindrical base having a radius equal to one half the inner diameter of said casing;
   an arched plate secured to said cylindrical base;
   several rods on said arched plate;
   and printed-circuit boards of said data-processing unit secured to said rods.

6. A speed-measuring radar device as claimed in claim 5, wherein said cylindrical base is provided with heat-rejecting ribs and said casing has ventilating holes opposite said ribs.

7. A speed-measuring radar device as claimed in claim 1, wherein said casing is provided with a hermetic radome housing, on the side of said antenna, and with a hermetic transparent cover, on the side of said data-processing unit, and has sealing gaskets at points of communication with the atmosphere.

* * * * *